Feb. 15, 1938.　　　E. E. EHRLICH　　　2,108,111
RETRIEVER FOR ELECTRIC CORDS
Filed Sept. 16, 1935　　　3 Sheets-Sheet 2

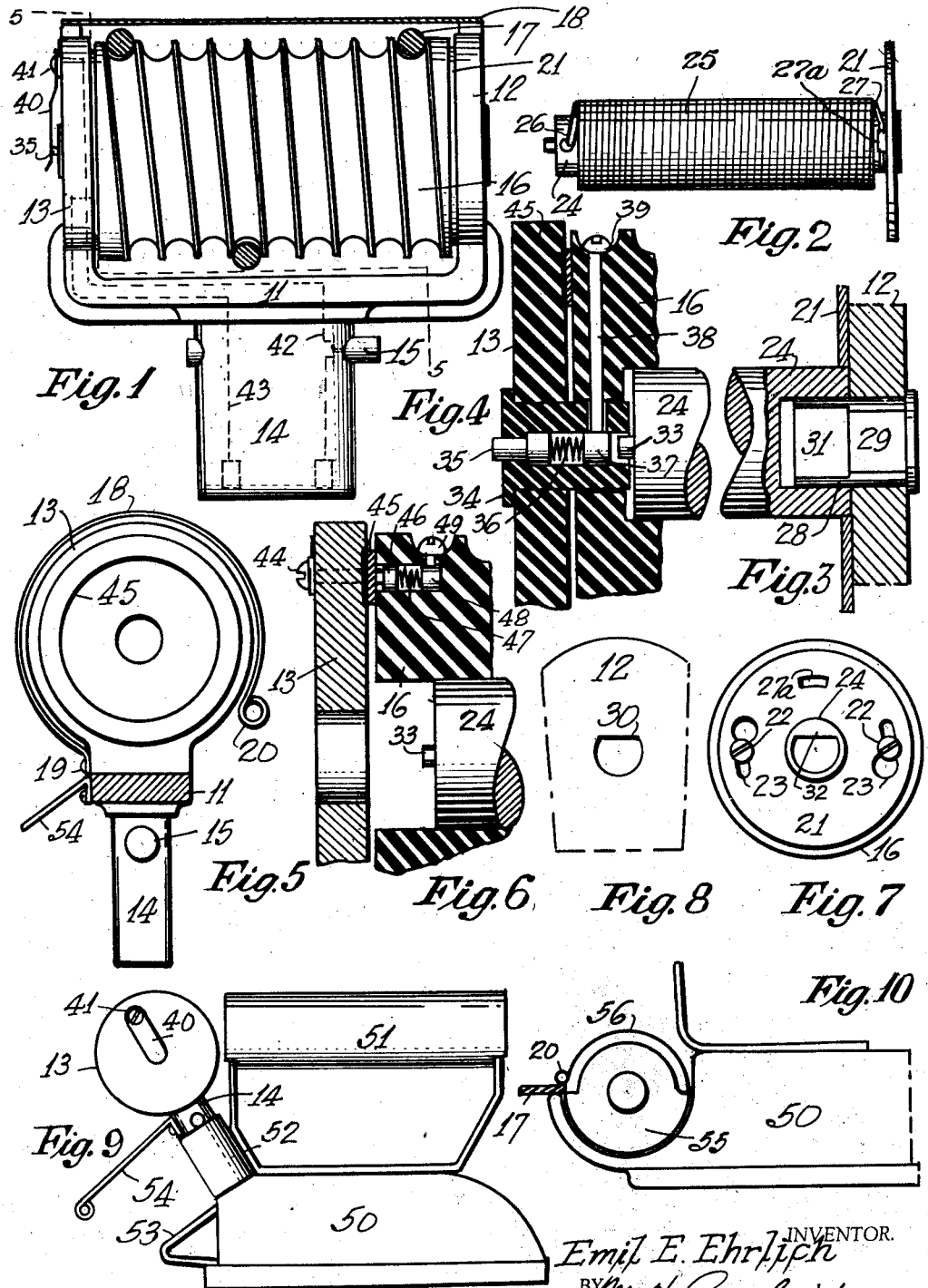

INVENTOR.
Emil E. Ehrlich,
BY M. A. Loughridge
ATTORNEY.

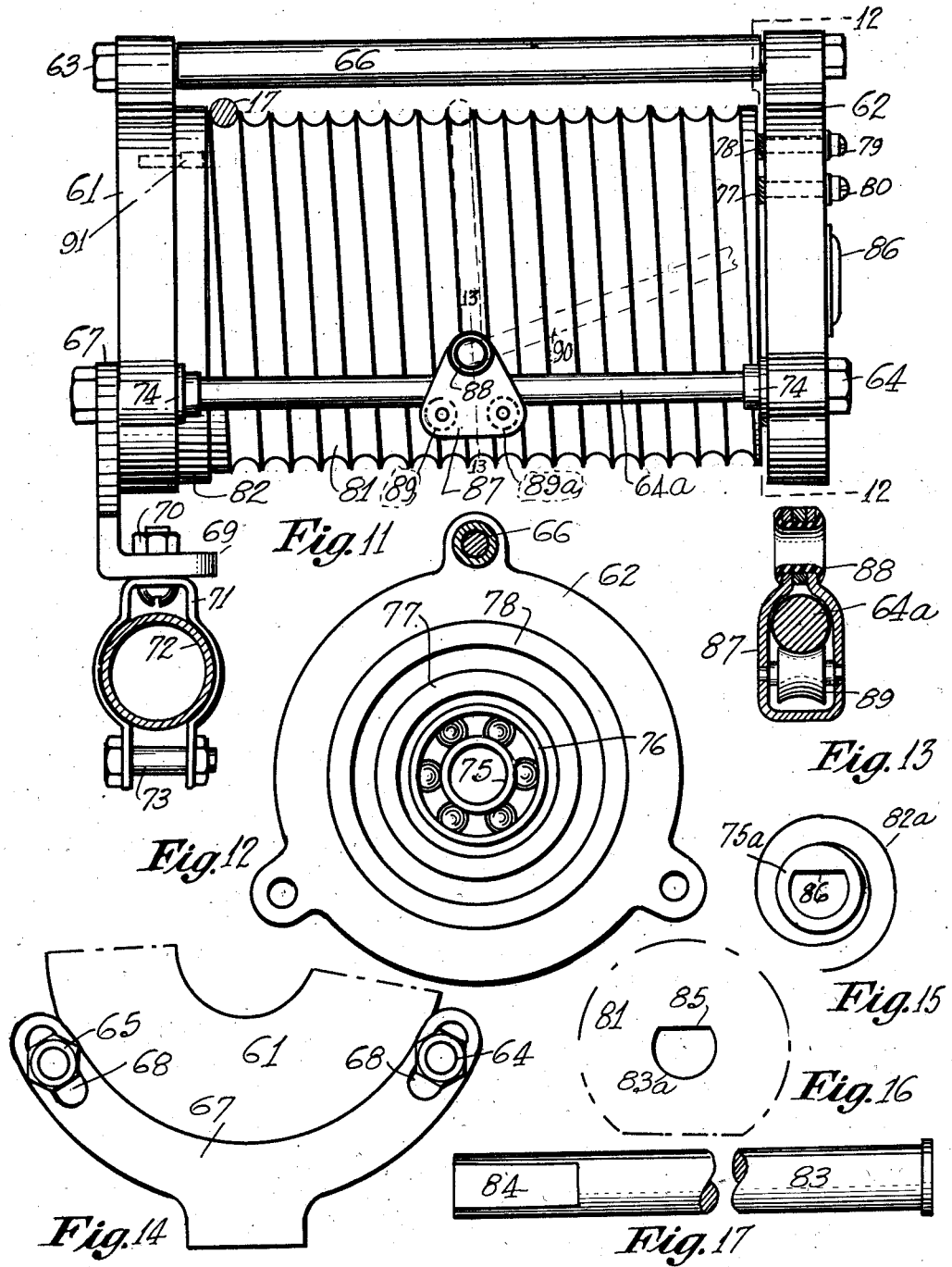

Patented Feb. 15, 1938

2,108,111

UNITED STATES PATENT OFFICE 2,108,111

RETRIEVER FOR ELECTRIC CORDS

Emil E. Ehrlich, Tampa, Fla.

Application September 16, 1935, Serial No. 40,713

2 Claims. (Cl. 219—25)

This invention relates to retrievers for electric cords for use between portable electrical instruments and a fixed electric outlet, such as the cord for an electric lamp, the connection to an electric iron, the connection to a telephone, to a vacuum cleaner or floor scraper, the connection to a mining locomotive and the like. Retrievers are used for this purpose to take up the slack of the electric conductor and to keep the conductor out of the way and protected as the electric instrument is moved about from place to place.

The present retriever includes a mechanism that is comparatively simple to make; that is readily taken apart and reassembled; that can be attached to or built into and carried by the electric instrument or that may be mounted on a fixed support. The invention further includes means for adjusting the position of the retriever by an adjustable mounting and means for guiding the cord as it is unwound and rewound on the drum of the device. Other objects of the invention reside in the details of construction and arrangement of parts as more particularly pointed out in the following specification and illustrated in the accompanying drawings; in which Fig. 1 is a side elevation of one form of the invention with the cover and the conductor in section;

Fig. 2 shows a form of coil spring and mounting therefor for use in Fig. 1;

Fig. 3 is a sectional view through the right hand bearing in Fig. 1;

Fig. 4 is a sectional view on the left hand bearing of Fig. 1;

Fig. 5 is an end view of the frame on line 5—5, Fig. 1;

Fig. 6 is a sectional detail showing the method of making an electrical connection from the wire groove to a terminal on the frame;

Fig. 7 is an end view of Fig. 2, looking towards the left;

Fig. 8 is a detail of the end frame in Fig. 1;

Fig. 9 shows the application of the invention to an electric iron;

Fig. 10 shows another modification of the invention built integrally into an electric iron;

Fig. 11 is a side elevation of another form of the invention;

Fig. 12 is an end view on line 12—12, Fig. 11;

Fig. 13 is a sectional elevation on line 13—13, Fig. 11;

Fig. 14 shows an end view of the adjustably supporting bracket;

Fig. 15 shows the attachment of the operating spring to its arbour;

Fig. 16 is an end elevation of the drum in Fig. 1, adjoining the spring in Fig. 15, and Fig. 17 is a view of the shaft upon which the drum is mounted.

Figure 10A:
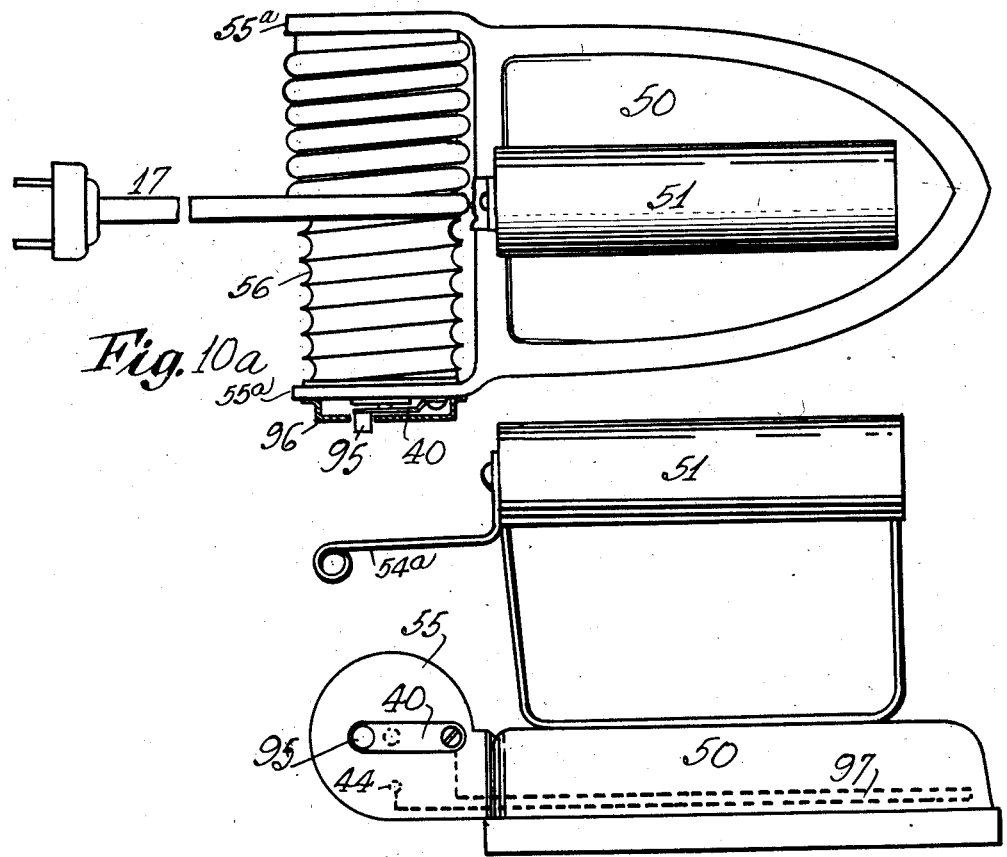
Fig. 10a is a plan view of an electric iron, with the retriever built into the rear of the iron and having the cover removed.

In the drawings, 11 is a frame having the upstanding, disc-shaped ends 12 and 13 and provided with the attachment plug 14 of the usual type for inserting in an electric socket to establish a circuit to the conductors 42, 43, which may be controlled by the push switch 15.

Drum 16, with the spiral groove thereon, may be moulded from insulation or may be made of wood, and is mounted for rotation between the ends 12 and 13, and the electric cord 17, usually comprising a pair of flexible conductors, is wound on the spiral of the drum 16. Cover 18 encloses the device and is secured to the frame at 19 and has the opposite edge formed in a coil at 20, below which the conductor is taken off. The cover 18 is located close to the conductor 17 at the top, so that the conductor does not have enough space to ride the ridges between the grooves on the drum 16.

The drum 16 is retrieved or rotated in the direction to wind up the cord by the coil spring 25, mounted on the mandrel 24 and which is inserted in an aperture, Figs. 4 and 6, in the center of the drum 16. One end of the spring 25 connects at 26 to the mandrel 24 and the opposite end 27 by the cleat 27a Fig. 2, which is punched from the stack of disc 21, connects to the disc 21 which is mounted to rotate on mandrel 24. The disc 21 is mounted on the end of drum 16 as indicated in Fig. 7, by the screws 22, passing through the keyhole slots 23, so that the spring with its mounting may be readily detached from drum 16.

An aperture is provided on the end 12, Fig. 3, to receive the stud 28, the end of which also enters a corresponding aperture in the mandrel 24. It will be observed that the stud 28 has a flat side at 29 and another flat side at 31. When in place the flat side 29 engages the flat side 30, Fig. 8, in the end 12, and the flat side 31 engages the flat side 32 of the mandrel 24, with the result that the mandrel 24 is locked with a non-turning engagement to the frame end 12, while the disc 21, attached to the drum 16, is free to rotate and to apply tension to the spring 25 as the cord is unwound, which tension rewinds the cord as slack develops therein.

In the opposite end 13 of the frame, the stud 34 of insulation is placed in a central aperture and has a central opening with which the dowel 33 of the mandrel 24 registers and is thereby held in alignment. A central stem 35 of conducting material projects from stud 34 by the action of spring 36 and the head 37, which connects by screw 38, passing through the body 16 of the drum and engaging one of the conductors in the spiral groove at 39, thereby establishing one side of the circuit to the stem 35. From the stem 35 the circuit is continued by a switch 40 in series with the conductor, rotatable about screw 41 and connected by conductor 42 to the operating circuit. This conductor may be embedded in frame 11 and socket 14 as indicated in dotted outline.

The other conductor of the cord may be connected to an annular band 45, Figs. 5 and 6, secured to the end 13, by the screw 44, which connects through the plunger 46, controlled by spring 47 to the head 48, and by the screw 49 in the spiral groove, and is connected with one of the conductors. The circuit may be continued by conductor 43 to the operating switch.

The type of my invention illustrated in Fig. 1, may be applied to a flat iron as indicated in Fig. 9, in which the socket 52 of the flat iron receives the plug 14 of the retriever, and the drum is mounted transversely of the body of the flat iron which is operated by the usual handle 51 and is provided with the bracket 53 by which the iron can sit on its end when the retriever is removed. The bracket 53 is secured to the frame 11 and extends beyond the vertical frame of the retriever so that the iron may stand on its end in the usual way, supported by 54 and the retriever when the retriever is in use. A construction of this kind when applied to a flat iron is disclosed in my co-pending application, Serial No. 541,283, filed June 1, 1931. In the modified construction in Fig. 10, the frame of the retriever 55 is constructed integral with the body of the flat iron 50 and is provided with the end plates 55 for supporting the drum 56 as in Fig. 1.

In the plan view in Fig. 10a, the end switch 40 is shown provided with an insulated cover 96, shown in section, having a slot therein for the insulated stem 35 by means of which the switch is operated while it is protected by the cover. It will be observed from the plan view in Fig. 10a, that the flat iron has the usual triangular shape with the base of the triangle at the rear and with the retriever located substantially in the same plane as the base of the iron. The body of the iron has the frame members 55a formed integrally therewith and substantially in line with the side of the rear end or base of the iron, providing space for the dum 56 of a width equal to the rear end of the iron.

Figure 10B:
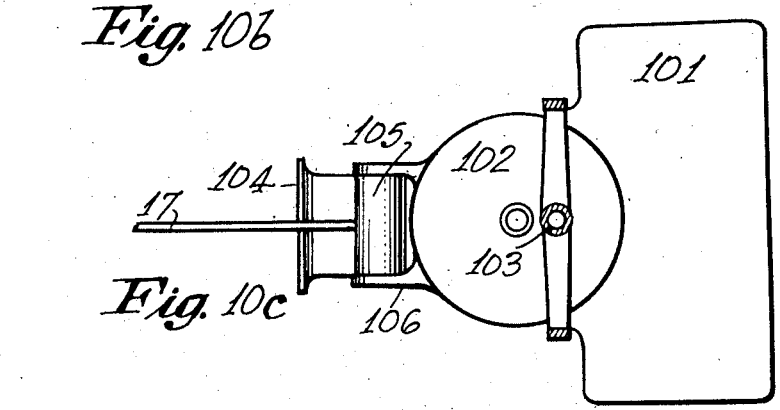
Fig. 10b is a side elevation of the iron in Fig. 10a, showing means for supporting the iron on its end vertically.

The object of the construction in Figs. 10a and 10b is to provide a drum with as large a cord capacity as possible without making it obtrusive, or materially larger than the end of the iron so that it will offer no obstruction in the operation of the iron through tight apertures in clothes. For this purpose the end frame of the retriever is developed from the body of the iron at the rear and substantially in line with the body. The drum is placed between the end plates extending across the rear of the iron and with its centre in line with the body of the iron. This makes a compact construction with a long drum with a comparatively large roll of cord aligning with the body of the iron. It should be noted that the pull on the cord is close to the line of the centre of gravity of the iron so that there can be little tendency of the cord to divert the iron from its course.

The illustration in Fig. 10b, shows the heating elements 97 of the iron, connected to the switch 40 which connects to the central contact member 35, Fig. 4, leading to one of the conductors of the cord. Raising 95, Fig. 10b, opens the circuit. The other side of the heating element connects to terminal 44, Fig. 6 leading to the other conductor of the cord. The bracket 54a, secured to the handle 51 with the drum of the retriever 55 forms a three point support for the iron when it is placed in the vertical position.

Figure 10C:
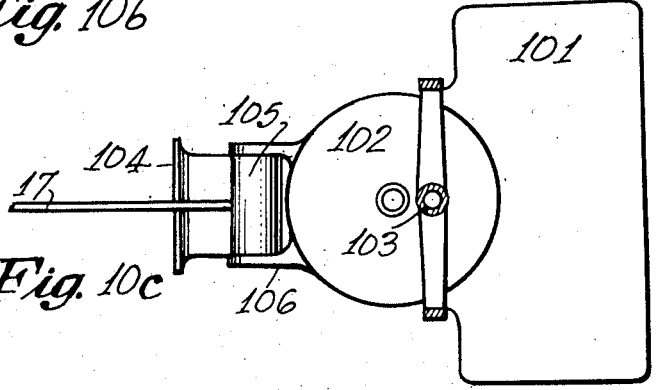
Fig. 10c shows a retriever built into a vacuum cleaner.

The illustration in Fig. 10c shows a vacuum cleaner 101, having a frame 106 with the usual orifice 104 and with a motor 102 and to which this handle 103 is attached. The retriever 105 is mounted on a developed portion of the frame 106 as shown.

In the form of the invention shown in Fig. 11, the retriever may be readily expanded to suit long cords without change in the apparatus except in the length of the drum and in the length of the rods upon which the apparatus is assembled. In this construction a pair of similar end plates 61 and 62 are provided with suitable lugs having apertures for the bolts 63, 64, and 65. These bolts are provided with suitable flanges at 74 so that when assembled the bolts and the end plates form a frame upon which the drum 81 with a spiral groove is mounted. The device is supported by the bracket 67, provided with slots 68 to receive the clamping bolts 64 and 65 and the lower end of the bracket 69 has a swivel connection at 70 with the clamp 71, secured by bolt 73 to the shaft 72. It will be observed that the frame is rotatable axially on the bracket 67 to the extent of the slots 68 and that it also swivels about the bolt 70. The shaft 72 may be the shaft of a vacuum cleaner, a floor scraper, or like machine, or it may be some suitable fixture to which the clamp 71 is secured. When the mechanism is secured to the vacuum cleaner or similar machine, it is preferred that it be mounted as close as possible to the head of the machine so as not to materially alter its center of gravity.

The circuit to the conductors on the drum 81 may be established through a pair of contact rings 77 and 78 which connects by the screws 80 and 79 respectively through the end plate 62 to the operating circuit as desired. The connection from the spiral groove to the contact rings 77 and 78 may be made as shown in Fig. 6.

A box spring 82, placed against the end plate 61, and having its outer end rigidly connected thereto, through the pin 91, may be used to retrieve the drum. For this purpose the inner end of the spring 82 connects as shown in Fig. 15 by 82a, to the arbour 75a of the ball bearing in the end plate 61. This arbour is provided with a flat side 86 and the drum 81 is mounted on shaft 83, which is mounted in the ball bearings 75 in the end plates, the aperture 83a in the drum 81, Fig. 16, in which shaft 83 is placed, has a flat side at 85 so arranged that when shaft 83 is in place, flat side 84 of this shaft provides a non-turning engagement between the arbour 75a and the drum 81, thus connecting the drum with the box spring to retrieve the drum in operation.

In order that the cord may freely align with the spiral groove on the drum 81, a longitudinal roller 66 is provided on the bolt 63 at the top so as to rotate when engaged by the conductor in winding and unwinding and thereby reduce the wear on the conductor. The take-off end of the conductor may be guided by the slide or trolley 87, mounted on one of the bolts at 64a forming the frame and having an insulated eye at 88 through which the conductor is led. This slide comprises a frame bent from sheet stock to enclose the bolt 64a and to carry the friction rollers 89 and 89a, spaced below the bolt 64 and from the center line of the line 88, which is located above the bolt 64a. This construction insures free movement of the slide and the two rollers avoids binding as the conductor is wound upon the spiral. The shaft 83 is held in place by the end plate 86.

In this construction it will be noted that the capacity of the retriever for receiving a cord can easily be regulated by varying the length of the drum and varying the length of the bolts 63, 64 and 65 accordingly, without changing the rest of the structure. It can be mounted in place and may be rotated about its axis on bracket 67 to bring off the cord through the eye 88 at the most convenient angle and it may be swivelly mounted at 71 so that the drum is at right angles to the take-off of the cord.

In this apparatus it should be observed that it may be mounted on a portable electric tool or instrument to move therewith, in which case the cord from the drum is taken to an electric outlet. It may also be mounted on a fixed support and in this case the electric cord is taken from the device to the portable tool but in either case the construction of the apparatus is essentially the same.

Having thus described my invention, I claim:

1. In combination, an electric iron with a cord and a retriever for said cord, comprising a body for the iron having a heating element and having a pair of rearwardly extending frame members substantially aligning with and parallel to the sides of the body at the rear, a retrieving drum mounted between said frame members with the centre of the drum in line with the body of the iron, means for automatically rotating said drum, said electric cord being wound upon said drum and connected into the circuit between the electric supply and the heating element of the iron.

2. In combination, an electric iron with a cord and a retriever for said cord, comprising a triangular shaped body for the iron having a heating element, with the base of the triangle at the rear of the iron, a retrieving drum substantially the width of and parallel with the rear of said base, a frame extending from and parallel with the outer sides of said base, said drum mounted on said frame in line with the body of the iron, a spring for rotating said drum, said electric cord being wound upon said drum and connected into the circuit between the electric supply and the electric heating element.

EMIL E. EHRLICH.